United States Patent [19]

Wang

[11] Patent Number: 5,263,155
[45] Date of Patent: Nov. 16, 1993

[54] SYSTEM FOR SELECTIVELY REGISTERING AND BLOCKING REQUESTS INITIATED BY OPTIMISTIC AND PESSIMISTIC TRANSACTIONS RESPECTIVELY FOR SHARED OBJECTS BASED UPON ASSOCIATED LOCKS

[75] Inventor: Chung C. Wang, Dallas, Tex.

[73] Assignee: Texas Instruments Incorporated, Dallas, Tex.

[21] Appl. No.: 658,919

[22] Filed: Feb. 21, 1991

[51] Int. Cl.⁵ .............................................. G06F 9/00
[52] U.S. Cl. ................................ 395/600; 364/281.4; 364/282.1; 364/283.4; 364/DIG. 1; 364/281.5; 395/650
[58] Field of Search ................................ 395/600, 650

[56] References Cited

PUBLICATIONS

Elmasri, Ramez et al., *Fundamentals of Database Systems*, The Benjamin/Cummings Publishing Company, 1989, pp. 556-568.

Date, C. J., *An Introduction To Database Systems*, Addison-Wesley Publishing Company, 1986, pp. 422-427.

Penney, Jason D. et al., "Is The Disk Half Full or Half Empty?", Workshop on Persistent Object Systems, Appin, Scotland, 1987.

Penney, Jason D. et al., Is the Disk Half Full or Half Empty? Combining Optimistic and pessimistic Concurrency Mechanisms in a Shared, Persistent Object Base (Abstract), Appeared: Workshop on Persistent Object Systems, Appin, Scotland, Aug., 1987, pp. 1-18, Maurice P. Herlihy, et al., Hybrid Concurrency Control For Abstract Data Types (Extended Abstract-Dec. 2, 1987), Appeared: ACM Symposium on Principals Offer Database Systems, 1988, pp. 1-25.

Wang, Chung C., A Strawman Reference Model in Transaction Processing for an Object Oriented Database (Abstract), Appeared: OODBTG Workshop, Oct. 23, 1990, Ottawa, Canda. Created in Information Technologies Laboratory, Technical Report 90-08-xx, Computer Science Center, Texas Instruments, Incorporated, P.O. Box 655474, MS 238, Dallas, Tex. 75265, pp. 1-10.

Andrews, Tim, et al., The Ontos Object Database (Technical Report), by Ontologic, Inc., Three Burlington Woods, Burlington, Mass. 01803, Oct., 1989, pp. 1-22.

Ullman, Jeffrey D., Principles of Database Systems; Chapter 11, Computer Science Press, Inc., 1982, pp. 369-408.

*Primary Examiner*—Thomas C. Lee
*Assistant Examiner*—Burch Harper
*Attorney, Agent, or Firm*—W. Daniel Swayze; Richard L. Donaldson; Leo N. Heiting

[57] ABSTRACT

A method is disclosed for concurrency control in a system having both pessimistic and optimistic transactions, comprises the steps of entering locks on objects both for optimistic and pessimistic transactions, and validating an optimistic transaction at commit time by checking that all objects on which said optimistic transaction holds a lock have not become obsolete during the execution of said optimistic transaction. Further, a system is shown enabling optimistic and pessimistic transactions to coexist, comprising a lock table into which locks are entered for both optimistic and pessimistic transactions, a wait queue in which pessimistic transactions are entered to wait for locks held by either optimistic or pessimistic transactions, a conflict table which is referenced to determine if a lock held by a first transaction is a conflict lock with respect to a lock requested by a second transaction, and code connected to the lock table, wait queue, and conflict table. This code which is responsive to transaction requests, updates the lock table and the wait queue so that optimistic transactions do not wait for locks to release, whereas pessimistic transactions do wait for locks to release. Other systems and methods are also disclosed.

7 Claims, 5 Drawing Sheets

CONFLICT TABLE

| REQ \ HELD | READ | WRITE |
|---|---|---|
| READ | N | Y |
| WRITE | Y | Y |

PESSIMISTIC MODE

FIG. 4

| REQ \ HELD | R.O. | R.P. | W.O. | W.P. |
|---|---|---|---|---|
| R.O. | N | N | N | N |
| R.P. | N | N | Y | Y |
| W.O. | N | N | N | N |
| W.P. | Y | Y | Y | Y |

MIXED MODE
602
604
424

FIG. 5

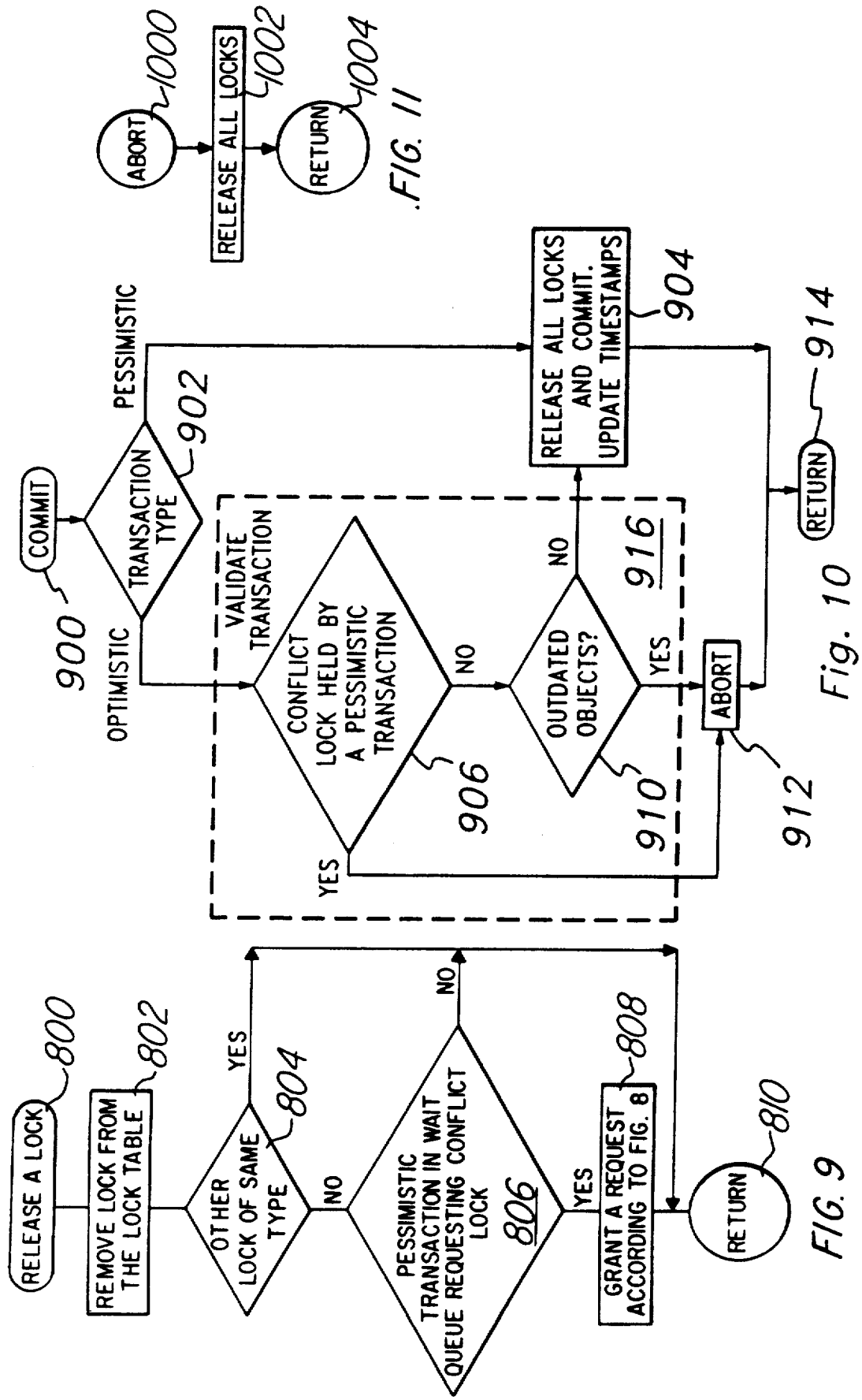

SYSTEM FOR SELECTIVELY REGISTERING AND BLOCKING REQUESTS INITIATED BY OPTIMISTIC AND PESSIMISTIC TRANSACTIONS RESPECTIVELY FOR SHARED OBJECTS BASED UPON ASSOCIATED LOCKS

BACKGROUND OF THE INVENTION

1. Field of the Invention

This invention relates to database management systems and in particular to a system and method for mixed-mode concurrency control of access to shared objects.

2. Description of the Related Art

The background of the invention is described in connection with database management systems as an example.

Without concurrency control a database with shared objects may become corrupted by transactions which operate in parallel. Consider a program which reads an object, increments its value, and stores the resulting value back into the object. If this program is executed simultaneously in two transactions, there is a potential for having an incorrect result stored in the object. Both transactions may read the same value, the value originally stored in the object. If both objects in parallel increment the value and sequentially store their respective results, the final value stored in the object only reflects one increment. This could have disastrous results. For example, in an airline reservation system, if the program counts the number of seats sold to a flight, such a transaction schema could result in overbooking the flight.

Concurrency control prevents the two competing transactions from accessing the same object in a manner which results in anomalies.

Heretofore, two well-known methods of concurrency control, in this field, have included pessimistic concurrency control and optimistic concurrency control. Pessimistic concurrency control is usually associated with locking mechanisms. Optimistic concurrency control, on the other hand, is usually associated with timestamps. At commit time, when the results of a transaction are committed to the database, if the timestamp, which would be the most recent modification time, of any of the objects relied upon by the transaction have been changed, the transaction must have used obsolete data, and is therefore aborted.

Whereas pessimistic concurrency control is preferable in systems with many conflicts, optimistic concurrency control is preferable in systems with few conflicts. It is faster to check timestamps than to check for conflict locks in a lock table. However, if there are many conflicts, many transactions will abort because of their dependence on data which became obsolete during the execution of the transaction.

Because many data base systems have some transactions which rarely cause conflicts and some transactions which frequently cause conflicts, it would be desirable to have a system with combined concurrency control modes, so that some transactions operate optimistically and others operate pessimistically.

A third form of concurrency control is a hybrid concurrency control protocol in which each transaction behaves partially like an optimistic transaction and partially like a pessimistic transaction. Each transaction maintains its own view of the database, by keeping an intentions list, which contains the transaction's sequence of operations. Each record in the intentions list describes the operation, its arguments and its results. The committed state is the intentions lists for committed transactions arranged in timestamp order. Finally, the database contains a set of locks for each active object.

When invoking an operation, the private view of a transaction is first computed from the transaction's intentions list and the committed state of the database. The operation, its arguments and result, are used to check for lock conflict. If a conflict exists, the transaction will wait and retry the operation at a later time.

At commit time, the intentions list of the transaction is incorporated into the committed state of the database and all associated locks held by the transaction are released.

Another form of hybrid concurrency control placed pessimistic features on optimistic transactions, so that transactions can access an object optimistically until it requests a lock on the object. Doing so enables other transactions to access the object and to commit new values of the object until the first transaction acquires a lock on the object. At that point, if the object has been modified by other transactions, the transaction can be aborted. Thus, under that protocol, transactions are neither optimistic nor pessimistic, rather they access some objects pessimistically and other objects optimistically.

In another system, optimistic transactions may be blocked due to conflict with pessimistic transactions. If an optimistic transaction attempts to access an object to which a pessimistic transaction holds a lock, the optimistic transaction goes into a wait state until the pessimistic transaction releases the lock. Thus, in such a system, optimistic transactions lose their optimistic nature when encountering a lock.

Therefore, it would be desirable to have a system in which optimistic and pessimistic transactions can coexist and retain the characteristics associated with their respective transaction types.

As seen above, some of the problems faced have been to enable pessimistic transactions to wait for locks on objects to which they need access, while allowing optimistic transactions to forge ahead without waiting for locks to release, and provide a means by which optimistic and pessimistic transactions can communicate to each other about each other's respective activities on shared objects so that serializability of the transactions can be assured. Accordingly, improvements which overcome any or all of the problems are presently desirable.

SUMMARY OF THE INVENTION

Generally, and in one form of the invention, a method for concurrency control in a system having both pessimistic and optimistic transactions, comprises the steps of entering locks on objects both for optimistic and pessimistic transactions, and validating an optimistic transaction at commit time by checking that all objects on which said optimistic transaction holds a lock have not become obsolete during the execution of said optimistic transaction.

Further, a system enabling optimistic and pessimistic transactions to coexist, comprises a lock table into which locks are entered for both optimistic and pessimistic transactions, a wait queue in which pessimistic transactions are entered to wait for locks held by either optimistic or pessimistic transactions, a conflict table which is referenced to determine whether a lock held by a first transaction is a conflict lock with respect to a lock requested by a second transaction, and code connected to the lock table, wait queue, and conflict table. This code which is responsive to transaction requests, updates the lock table and the wait queue so that optimistic transactions do not wait for locks to release, whereas pessimistic transactions do wait for locks to release.

An advantage of the invention is that a system need not be dedicated to either pessimistic concurrency control nor to optimistic concurrency control. Rather, it is possible for each transaction to be either optimistic or pessimistic in its approach to concurrency control. Thus, transactions which rarely have conflicts with other transactions can be optimistic, which avoids unnecessary checking of the lock table, and transactions which have frequent conflicts can be pessimistic, which avoids computations that have to be aborted due to obsolete data.

BRIEF DESCRIPTION OF THE DRAWINGS

In the drawings:

FIG. 4 is a conflict table for pessimistic mode concurrency control;

FIG. 5 is a conflict table for mixed-mode concurrency control;

FIG. 9 is a flow diagram of a procedure for processing a lock release in a preferred embodiment mixed-mode concurrency control system;

FIG. 10 is a flow diagram of a procedure for processing a transaction commit in a preferred embodiment mixed-mode concurrency control system; and FIG. 11 is a flow diagram of a procedure for processing a transaction abort in a preferred embodiment mixed-mode concurrency control system.

Corresponding numerals and symbols in the different figures refer to corresponding parts unless otherwise indicated.

DETAILED DESCRIPTION OF PREFERRED EMBODIMENTS

Figure 1:
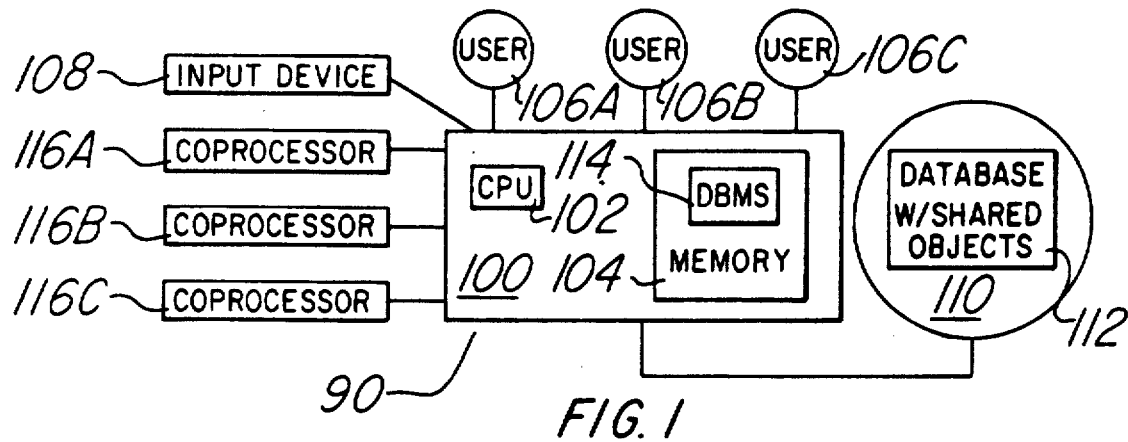
FIG. 1 is a block diagram of a multi-user single-processor computer system having a database management system for a database with shared objects.

In FIG. 1, a multi-user computer system 90 has a main processor 100 which consists of a central processing unit 102 and a memory 104. Processor 100 communicates with users 106, coprocessors 116, and a secondary storage 110. Users 106A, 106B and 106C can be human users working at terminals or workstations. Users 106 could also be process control input and controller devices. Processor 100 may also communicate to coprocessors 116A, 116B and 116C. Processor 100 is also connected to an input device 108, for example a disk drive, a tape drive, or a modem. Input device 108 may be used for loading computer programs from a magnetic media or via electronic wires into processor 100.

Processor 100 may contain additional circuitry (not shown) for interfacing CPU 102 and memory 104 to users 106 and to external devices 108, 110 and 116.

During execution, memory 104 contains the computer programs being executed on processor 100, for example a database management system (DBMS) 114, which manages a database 112 residing on secondary storage 110. Memory 104 may also contain other programs (not shown) which execute independently of DBMS 114 or which are in communication with DBMS 114. Examples of such programs are application programs for accessing the database and, in the process control environment, device drivers for sensors and controllers.

Database 112 is a database with shared objects, meaning that more than one user 106 or coprocessor 116 can access the same objects in the database.

Multiple users 106 and coprocessors 116 should not be construed as a limitation; a database with shared objects could also exist in a single user environment wherein several application programs are accessing the database simultaneously. For example, in a process control system, sensors and controllers may access the same objects in the database which stores information about the process.

Figure 2:
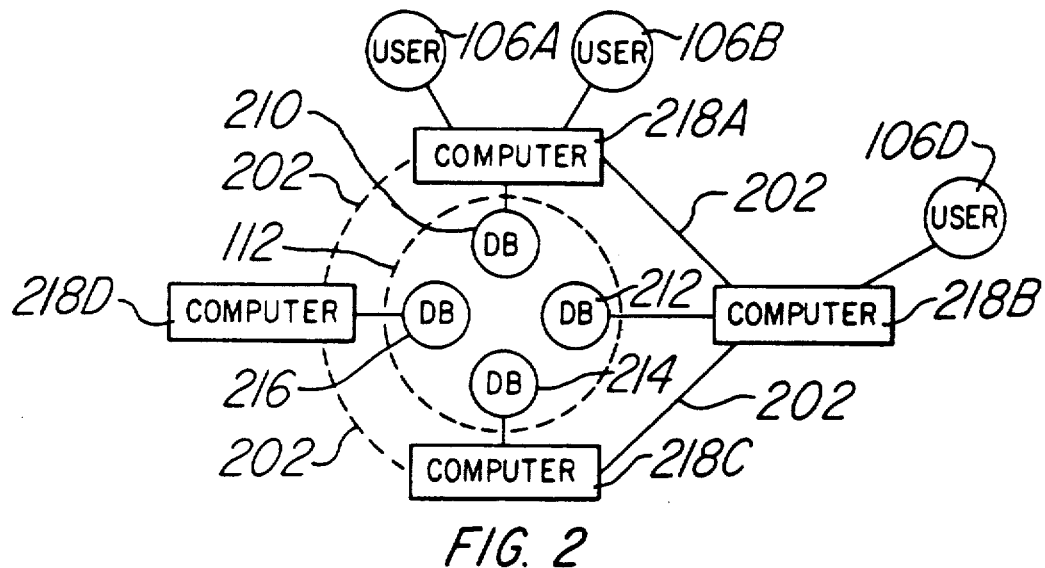
FIG. 2 is a block diagram of a multi-processor system with a distributed database having shared objects.

FIG. 2 a depiction of a multi-processor system with a distributed database having shared objects. A database 112 is composed of database portions 210-216. The various portions 210-216 are connected to distinct computers 218A, 218B, 218C and 218D, which are interconnected by a computer network 202. Each database portion may have shared objects, either shared among users on the same machine or shared between machines. For example, a user 106 can access an object also accessed by another user 106 or accessed by a program executing on another computer 218.

Figure 3:
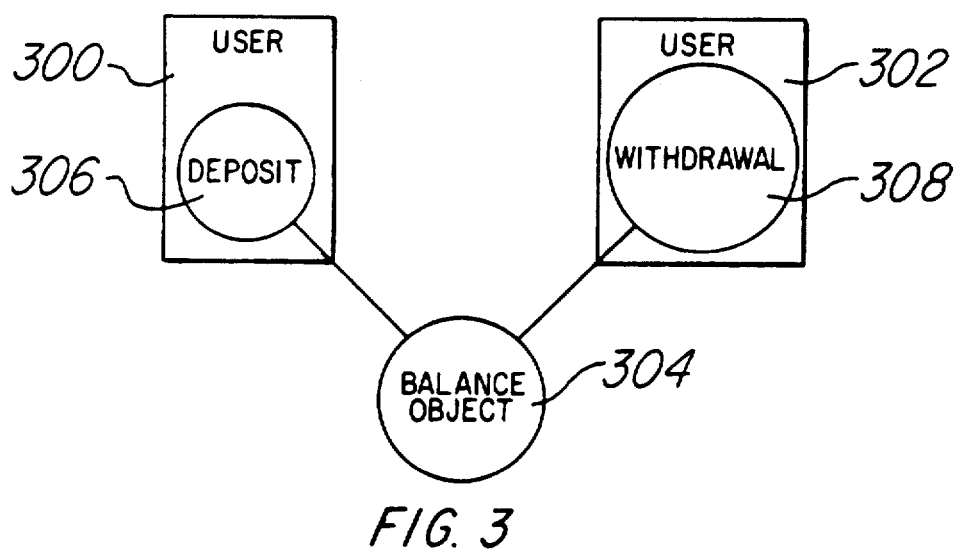
FIG. 3 is a block diagram of two transactions operating concurrently on a shared object.

FIG. 3 shows how a conflict can occur between two users or two transactions. As an example, a user 300 is executing a deposit transaction 306, and a user 302 is executing a withdrawal transaction 308. Both transactions need write access to an object 304 which contains a balance.

FIG. 4 shows a conflict table for pessimistic concurrency control. The horizontal axis represents the type of lock held by a transaction and the vertical axis represents the lock type requested by another transaction. As can be seen from the table, when a lock is already held by a transaction, the only time there is not a conflict lock is when the transaction holding a lock holds a read lock and the requesting transaction requests a read lock. In all other cases there is a conflict lock.

Figure 6:
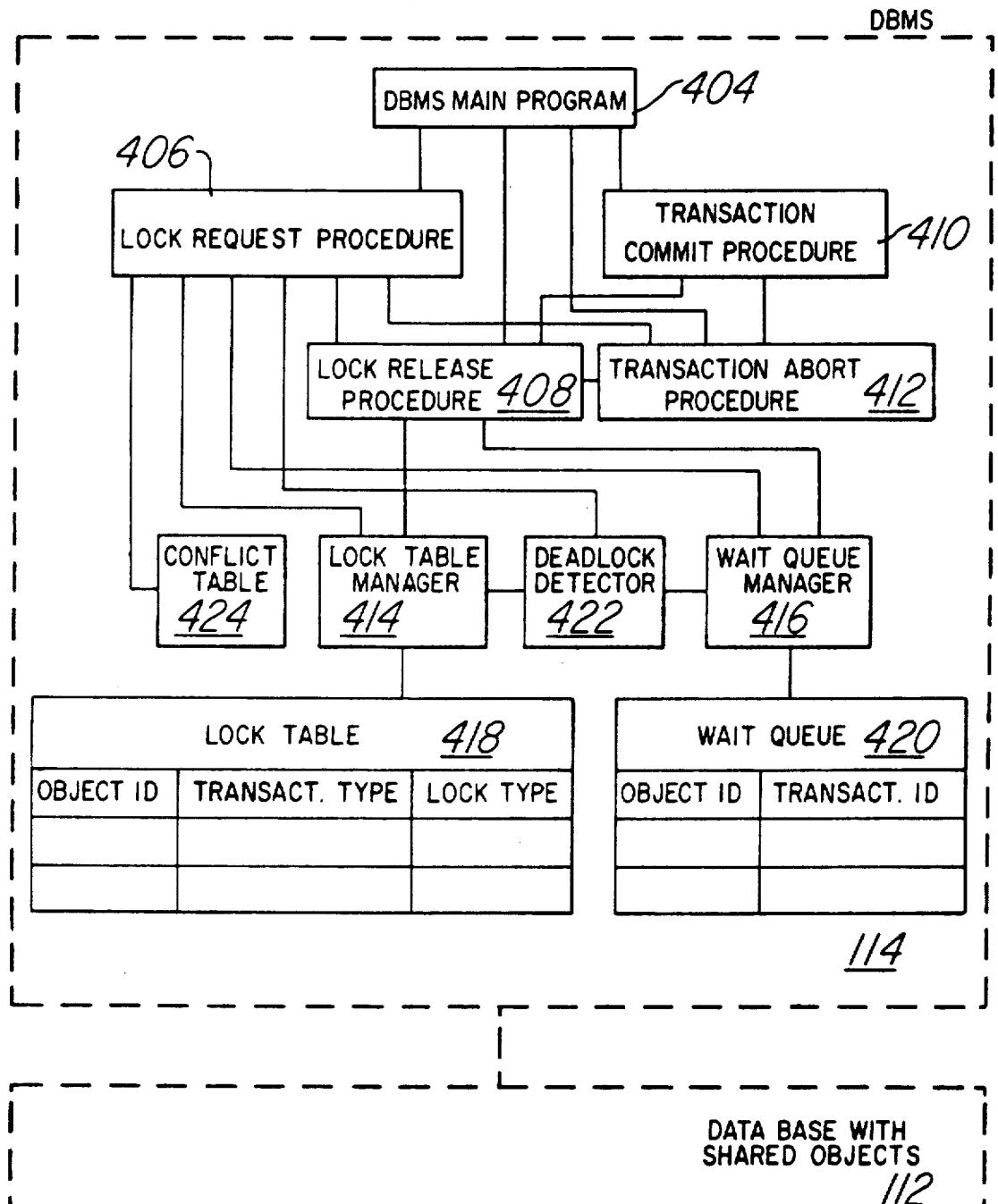
FIG. 6 is a block diagram of a preferred embodiment of a database management system (DBMS) having mixed-mode concurrency control and a database with shared objects.

FIG. 5 shows a conflict table which has been augmented with locks from optimistic transactions. In a preferred embodiment of mixed-mode concurrency control, database management system 114 allows for both transactions operating in pessimistic mode and transactions operating in optimistic mode. In a strictly pessimistic mode system, every transaction checks for and obtains a lock on each object it needs before accessing that object, but in an optimistic mode system transactions neither check for locks nor do they lock objects before accessing the objects. On the other hand, in a preferred embodiment of a DBMS with mixed-mode concurrency control, both optimistic and pessimistic transactions obtain locks on objects they access. These locks are entered into a lock table 418, as shown in FIG. 6. However, only pessimistic transactions check for lock conflicts before obtaining the lock. Optimistic transactions, on the other hand, check for conflict locks and for outdated objects at commit time.

FIG. 6 shows the structure of a preferred embodiment of a DBMS 114 which provides for mixed-mode concurrency control. It provides for sharing objects between multiple transactions, some of which may operate as optimistic transactions and others as pessimistic transactions. The concurrency control features of DBMS 114 are contained in four procedures: a lock request procedure 406, a lock release procedure 408, a transaction commit procedure 410, and a transaction abort procedure 412.

DBMS 114 includes a lock table 418, which contains records for locks on objects in database 112. Each lock table record includes the object identifier, the transaction type (optimistic or pessimistic) and the lock type (read or write). DBMS 114 also includes a wait queue 420, in which it stores pessimistic transactions waiting for access to particular objects. Each record in wait queue 420 contains the object identifier and the transaction identifier for transactions waiting to access objects to which other transactions hold locks.

DBMS 114 manages database 112, which contains shared objects. DBMS 114 has a main program 404 which, in addition to some procedures which are not shown, is connected to lock request procedure 406, lock release procedure 408, transaction commit procedure 410, and transaction abort procedure 412. These are in turn interconnected. For example, lock release procedure 408 is connected to lock request procedure 406, transaction commit procedure 410 is connected to lock release procedure 408, transaction commit procedure 410 is connected to transaction abort procedure 412, and transaction abort procedure 412 is connected to lock release procedure 408.

While procedures 406 through 412 could be implemented to directly manage lock table 418 and wait queue 420, in one embodiment DBMS 114 contains a lock table manager 414 and a wait queue manager 416. In which case procedures 406 through 412 call upon managers 414 and 416 to manage lock table 418 and wait queue 420, respectively.

For example, lock request procedure 406 is connected to lock table manager 414, to wait queue manager 416, and to conflict table 424.

DBMS 114 further comprises a deadlock detector 422, which is connected to lock request procedure 406, lock table manager 414, and wait queue 416.

Lock release procedure 408 is also connected to lock table manager 414 and to wait queue manager 416.

Figure 7:
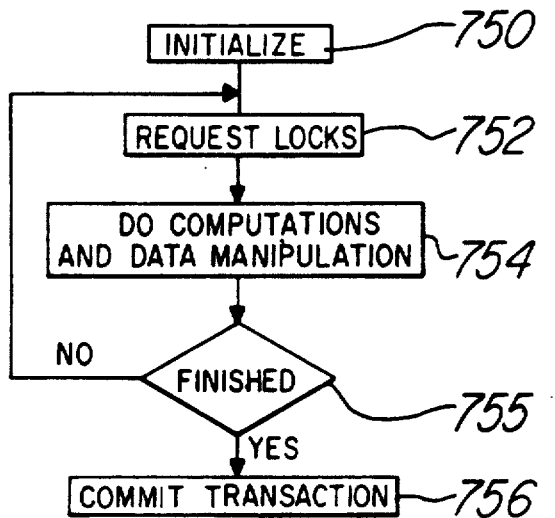
FIG. 7 is a flow diagram of the steps a preferred embodiment database management system uses in processing a transaction.

FIG. 7 shows the method steps by which DBMS 114 processes one particular transaction. It can process several transactions in parallel, all of which go through the same steps as the ones shown in FIG. 7. Step 750 is an initialization step. While the method for mixed-mode concurrency control does not require any particular initialization, a transaction may go through certain preparatory steps prior to database access.

In step 752, DBMS 114 processes the transaction's lock request. In this step the transaction is assigned locks on all the objects to which the transaction requires access. The locks are characterized, as shown in lock table 418 of FIG. 6, by object identifier, lock type, and transaction type. The detail of this step is described below in conjunction with FIG. 7. DBMS 114 enters locks made by both pessimistic and optimistic transactions into lock table 418. However, it only checks for conflict locks when processing pessimistic transactions. Therefore, DBMS 114 only places pessimistic transactions into a wait state in conflict situations.

After DBMS 114 has assigned all the locks the transaction requires, it proceeds to step 754 which is to carry out the computational and data manipulation portions of the transaction. After having completed the computations and data manipulations of step 754, DBMS 114 makes a determination of whether the transaction has finished or whether it needs to access additional objects, step 755. In the latter case, steps 752 and 754 are repeated.

Finally, DBMS 114 commits the transaction results. Which is indicated by block 756. The details of transaction commit is discussed in further detail in conjunction with FIG. 10.

For the tasks of updating and retreiving information from lock table 418 and wait queue 420, as required in the processing of a transaction, DBMS 114 relies upon lock table manager 414 and wait queue manager 416. Lock table manager 414 adds and deletes entries from lock table 418. It also can answer queries about entries in lock table 418. Similarly, wait queue manager 416 adds and deletes entries from wait queue 420, and answers queries about the contents of wait queue 420.

Figure 8:
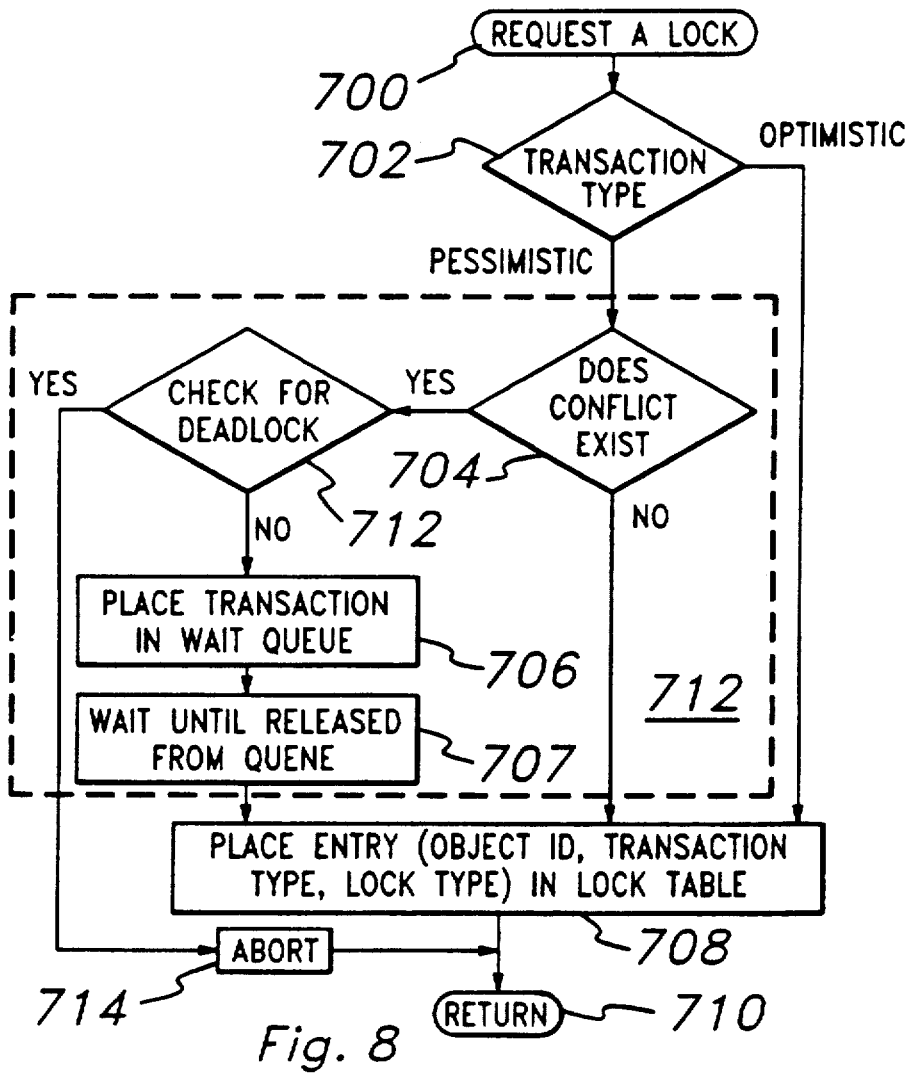
FIG. 8 is a flow diagram of a procedure for processing a lock request in a preferred embodiment mixed-mode concurrency control system.

FIG. 8 shows the procedure by which DBMS 114 processes a transaction's request for a lock on a particular object. The entry point to the procedure is item 700. DBMS 114 progresses to step 702 in which the transaction type is used to determine whether it is necessary to check for conflict locks. If the transaction is an optimistic transaction, DBMS 114 does not need to determine whether a conflict lock exists, but can go directly to step 708. For pessimistic transactions DBMS 114 determines whether a conflict lock exists and whether entering the transaction into wait queue 420 would cause a deadlock, which is indicated by block 716. In particular, DBMS 114, in step 704, determines if any conflict locks exist for the object. DBMS 114 calls upon lock table manager 414 to maintain lock table 418, which for each lock contains a record with an object identifier indicating which object is locked by the lock, the transaction type (optimistic or pessimistic) for the transaction which holds the lock, and the lock type (read or write). To determine if there is a conflict lock, lock table 418 is first searched for all locks on the object. For each such lock, conflict table 424 in FIG. 5 is consulted. The horizontal axis in the table represents the lock held by a transaction, and the vertical axis represents the requested lock. R.O. is read lock for an optimistic transaction, R.P. is a read lock for a pessimistic transaction, W.O. is a write lock for an optimistic transaction, and W.P. is a write lock for a pessimistic transaction. Thus, for example, if an optimistic transaction is requesting a read lock (R.O.) for an object for which a pessimistic transaction is holding a write lock (W.P.) there is no conflict, as is indicated by box 602. On the other hand, as another example, if a pessimistic transaction is requesting a read lock (R.P.) for an object for which an optimistic transaction is holding a write lock (W.O.), there is a conflict, as is indicated in box 604.

If the result of step 704 indicates that there is a conflict lock for a pessimistic transaction, then DBMS 114, in step 712, checks to see whether a deadlock would occur if the transaction is placed into wait queue 420.

Lock request procedure 406 calls upon deadlock detector 422 to check for deadlock. If a deadlock would occur, DBMS 114, in step 714, aborts the transaction, following the procedure discussed below in conjunction with FIG. 11. If no deadlock would occur by placing the transaction in wait queue 420, DBMS 114, calling wait queue manager 416, places the transaction therein, as indicated by step 706. The transaction remains in a wait state until the lock is released and the transaction is removed from wait queue 420, as indicated by step 707.

However, if there is no conflict lock detected by step 704 or if the transaction is an optimistic transaction, then, in step 708, DBMS 114, using lock table manager 414, places a lock in lock table 418. The record in lock table 418 includes an identifier for the object, the transaction type and the lock type.

In all cases, in step 710, the method for processing a lock request terminates by returning to the program which requested the lock.

FIG. 9 shows the method by which DBMS 114 releases a lock. The procedure commences at entry point 800. It then continues to step 802 in which, using lock table manager 414, it removes the lock table entry for the lock being released.

In step 804, DBMS 114 calls upon lock table manager 414 to obtain information from lock table 418. It then uses this information to determine if there is in lock table 418, any lock of the same type as the lock being released. If such is the case, DBMS 114 can return to the calling program, in step 810.

If there is no other lock of the same type for the same object in lock table 418, DBMS 114 continues to step 806 in which it determines, by calling wait queue manager 416, if there are any pessimistic transactions in wait queue 420 requesting a conflict lock. The procedure for determining if there is a conflict lock is to first search wait queue 420 for any transactions waiting to lock the object in question. If that is not the case, DBMS 114 returns to the calling program. Otherwise, DBMS 114 continues with step 808, which is to grant a lock request for the object to one of the transactions in wait queue 420, according to the procedure for granting lock requests described above in conjunction with FIG. 8. The lock release procedure terminates by returning to the calling program, in step 810.

The procedure for committing a transaction is shown in FIG. 10. Committing a transaction is, for example, the process of storing objects back into database 114 or reporting a result to a user. The procedure commences at entry point 900. The first step, step 902, is to choose a path through the procedure based on the transaction type. In the event of a pessimistic transaction, DBMS 114, in step 904, releases all locks held by the transaction and commits the transaction. However, if the transaction is optimistic, DBMS 114 validates the transaction prior to committing its results, which is indicated by block 916. In particular, DBMS 114 checks the lock table to determine if for any of the objects for which the transaction holds locks there are conflict locks held by any pessimistic transaction. DBMS 114 does this check in step 906. Any such locks would invalidate the optimistic transaction which must then be aborted, which it does in step 912, following the procedure described below, in conjunction with FIG. 11.

Furthermore, for optimistic transactions DBMS 114 checks for out-dated objects, as indicated by block 910. Each object, when committed, is assigned a timestamp indicating its time of creation or most recent modification. When an optimistic transaction obtains a lock for an object, it notes the time stamp. In step 910 the timestamp of the version of the object used by the transaction is compared to the timestamp of the object in database 112. If the database version is newer, the object used by the transaction is outdated, and the transaction is aborted, which is done in step 912. If there are no outdated objects, then DBMS 114 would release all the locks held by the transaction and commit the transaction, step 904. Furthermore, in step 904 DBMS 114 updates the timestamp of all objects in database 112 modified during the execution of the transaction. The commit procedure terminates by returning to the calling program, in step 914.

The abort procedure is shown in FIG. 11. The entry point to the abort procedure is step 1000. All locks are released in step 1002, according to FIG. 9, and the procedure returns to the calling program in step 1004, without committing the transaction results.

While this invention has been described with reference to a few illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A computer implemented method for concurrency control in a computer system having both pessimistic transactions and optimistic transactions, comprising the steps of:
(a) requesting a lock by a requesting transaction from either said pessimistic transactions or said optimistic transactions wherein said lock is associated with a requested object of a plurality of objects existing in said computer system;
(b) if said requesting transaction is one of said pessimistic transactions, denying access to the requested object if said lock associated with said requested object is already registered with the computer system;
(c) if said requesting transaction is one of said optimistic transactions, registering with the computer system the requested lock and allowing access to the requested object regardless if said lock associated with said requested object is already registered with the computer system; and,
(d) if said requesting transaction is one of said optimistic transactions, validating said requesting transaction at commit time by checking that the requested object on which said requesting transaction has registered said lock has not become obsolete during the execution of said requesting transaction.

2. The method of claim 1,
wherein step (c) comprises the step of associating a timestamp with both a version of the requested object to which said requesting transaction holds said lock and the requested object;
wherein step (d) comprises the step of verifying that the timestamp of the version of the requested object to which said requesting transaction holds said lock is the same as the timestamp of the requested object; and,
wherein step (d) comprises the step of verifying that the requested lock associated with said requested object is not already registered with the computer system by one of said pessimistic transactions.

3. A computer system for concurrency control of shared objects wherein optimistic and pessimistic transactions can coexist, comprising:
- a lock table into which locks are entered for both optimistic and pessimistic transactions;
- a wait queue in which pessimistic transactions are entered to wait for locks held by either optimistic or pessimistic transactions;
- a conflict table which is referenced to determine if a lock held by a first transaction is a conflict lock with respect to a lock requested by a second transaction; and
- a code apparatus connected to said lock table, said wait queue, and said conflict table, which in response to transaction requests, updates said lock table and said wait queue so that optimistic transactions do not wait for locks to release, and pessimistic transactions do wait for locks to release.

4. The computer system of claim 3, wherein said code apparatus further comprises:
- a lock request procedure connected to said wait queue and said lock table, which in response to a lock request from an optimistic transaction places a record in said lock table, which in response to a lock request from a pessimistic transaction places a record in said lock table only if there is no conflict lock on the object for which said lock request is being made, and which in response to a pessimistic transaction places said pessimistic transaction in a wait queue if there is a conflict lock in said lock table.

5. The computer system of claim 3, wherein said code apparatus further comprises:
- a lock release procedure connected to said wait queue and said lock table, having a code apparatus responsive to a lock release request on an object from a transaction and operable to remove a lock record from said lock table, and having a code apparatus operable to grant a lock request to a pessimistic transaction waiting in the wait queue for a lock on said object.

6. The computer system of claim 3, wherein said code apparatus further comprises:
- a transaction commit procedure responsive to a commit request from a transaction having a code apparatus responsive to the type of said transaction to selectively abort said transaction whenever the transaction type is optimistic and at least one object to which said transaction holds a lock is obsolete, otherwise releasing all locks and committing the transaction.

7. The computer system of claim 3, wherein said code apparatus further comprises:
- a transaction abort procedure to release all locks held by a transaction being aborted.

* * * * *